(12) United States Patent
Bolliger et al.

(10) Patent No.: US 6,287,211 B1
(45) Date of Patent: Sep. 11, 2001

(54) INSTALLATION FOR AMUSEMENT PARK

(75) Inventors: Walter Bolliger, Antagnes; Claude Mabillard, Choëx, both of (CH)

(73) Assignee: Bolliger & Mabillard Ingenieurs Conseils S.A., Monthey (CH)

( * ) Notice: Subject to any disclaimer, the term of this patent is extended or adjusted under 35 U.S.C. 154(b) by 0 days.

(21) Appl. No.: 09/426,800

(22) Filed: Oct. 22, 1999

(30) Foreign Application Priority Data

Jan. 11, 1999 (CH) .................................................... 0043/99

(51) Int. Cl.$^7$ ....................................................... A63G 1/34
(52) U.S. Cl. ................................ 472/43; 472/59; 297/466
(58) Field of Search ................................ 472/43, 59, 60, 472/61, 130; 437/55; 297/466, 467, 468

(56) References Cited

U.S. PATENT DOCUMENTS

| | | | |
|---|---|---|---|
| 2,664,150 | * 12/1953 | Byrne | 297/466 |
| 2,970,638 | * 2/1961 | Halter | 297/452.25 |
| 4,359,200 | * 11/1982 | Brevard et al. | 244/122 |
| 5,203,612 | * 4/1993 | Pokrzywinski | 297/466 |
| 5,662,523 | * 9/1997 | Yasumaru et al. | 463/30 |
| 5,827,123 | * 10/1998 | Reverchon | 472/43 |

\* cited by examiner

*Primary Examiner*—Kien T. Nguyen
(74) *Attorney, Agent, or Firm*—Clifford W. Browning; Woodard, Emhardt, Naughton, Moriarty & McNett

(57) ABSTRACT

The installation for amusement park, comprises at least one vehicle designed in such a way as to be able to accommodate at least one passenger in at least one seat, associated with at least one retention device. The retention device comprises a pivoting bar mounted on a retention element intended to retain the passenger in the seat. The retention element features a complex spatial shape, of which the lower part, intended to come in contact with the passenger's thighs, comprises for this purpose two recesses forming a hollow corresponding approximately to the size of the passenger's thighs.

11 Claims, 6 Drawing Sheets

INSTALLATION FOR AMUSEMENT PARK

The present invention relates to an installation for amusement park, in particular to an installation of the roller coaster type.

Amusement parks in general feature a number of installations comprising vehicles in which passengers take place to undergo an original experience and encounter unusual emotions and sensations.

The installations comprising vehicles offer a very broad range of sensations, ranging from the straightforward ride, sometimes unusual in the form of ghost trains, to the aerial acrobatic rides which can be provided by roller coasters.

According to the speeds and accelerations to which each of these installations subjects the passengers, more or less stringent devices are required to keep the passengers secure. Accordingly, the modern roller coasters, with very daring configurations, are in general provided with very tight retention devices, true shackles which bind every passenger. These devices allow any risk to be avoided of the passengers being thrown out during the ride, but do detract from their comfort.

In installations which are less daring, but which are nevertheless affiliated to the category of roller coasters, retention bars are used, often in the form of a "T", the horizontal bar of the "T", which comes in contact with the passenger to keep him in the seat, being surrounded by a roll of foamed material in order to render its contact more comfortable.

Whether the rides are on roller coasters of an acrobatic nature, or on quieter versions, some passengers raise their arms in order to accentuate the sensations they are feeling. However, the very great majority of passengers appreciate being provided with grips which they can hold on to, and of which they make considerable use. In reality, these retention devices are entirely capable of restraining the passenger without his needing to seize the handles. The handles are accordingly intended to provide mental comfort to the passenger rather than contribute to their safety, but this does not reduce their usefulness.

Even if, in the majority, passengers visit amusement parks in families or as a group of friends, when the question arises of trying out an installation of this type, it is, in the final analysis, the feelings and impressions of the individual which determine each person's experience. The individual nature of the sensations is not the result, up to this point, of the installation itself, because the passengers are seated next to one another, in rows of two or four people in general, and the trains are made up of wagons of several rows. This means that there is an inevitable collective aspect to the ride, even if, as has just been said, the sensations are essentially of an individual nature.

In the search for new impressions or stronger impressions than those experienced hitherto, constructors are making recourse to more daring track layouts and even greater changes of level, but the collective character referred to above still remains.

Ideally, each passenger should be provided with an individual vehicle in order to experience in full the pleasures offered by the ride, and to experience stronger sensations due to these being enhanced by the sensation of freedom. To provide a somewhat simplistic comparison, a person feels, in overall terms, more at liberty on a bicycle than in a bus. Unfortunately, when the number of visitors is considered, and the outlay which would be necessary for the installation to be profitable, individual vehicles are immediately disqualified.

The aim of the present invention is to propose an installation which, by way of the design of its vehicles and the combination between the seat and the means of restraint, will allow in the first instance, for an outlay to be incurred which is comparable to known installations, but which will also allow, secondly, for the passengers to be placed in an environment which will intensify the sensations of individuality and liberty, giving each passenger the impression, albeit artificial, that he is seated on a flying carpet or that he is at the controls of a kind of flying scooter, while still guaranteeing optimum security with regard to the retention of the passenger in the seat.

To this end, the invention relates to an installation for amusement park, comprising at least one vehicle designed in such a way as to be able of accommodating at least one passenger in at least one seat, associated with at least one retention device comprising a pivoting bar topped by a retention element intended to maintain the passenger in the seat, wherein the retention element features a complex spatial form, of which the lower part, intended to come in contact with the passenger's thighs, comprises for this purpose two recesses forming a hollow corresponding approximately to the passenger's thighs.

The retention element can feature an external shape of multiple dishings and roundings and comprise handles, which can be located in the front part of the retention element, and form integrated parts of the same.

The retention element may comprise an edge of rounded form, in such a way as to match at least partially with the stomach of the passenger against whom it comes to rest when the retention device is in the blocking position.

According to one embodiment the upper surface of the retention element is of a generally dished and rounded appearance, and comprises a first rear face essentially trapezoidal in shape, inclined upwards, of which the large base is formed by the said edge of rounded shape, and of which the small base constitutes the side of a second upper face, inclining forwards, said element further comprising parts which are concave in shape, constituting two shoulder edges at the two front corners of the retention device, each of the said shoulder edges containing a perforation in the vicinity of the front end of the retention device, in such a way as to form handles.

The present invention also relates to said element for retaining a passenger in a seat of an installation for amusement park, and comprising a complex spatial form of which the lower part, intended to come in contact with the passenger's thighs, comprises for this purpose two recesses forming a hollow corresponding approximately to the passenger's thighs.

The description which follows, given by way of example, refers to the drawing, in which.

Figure 1:
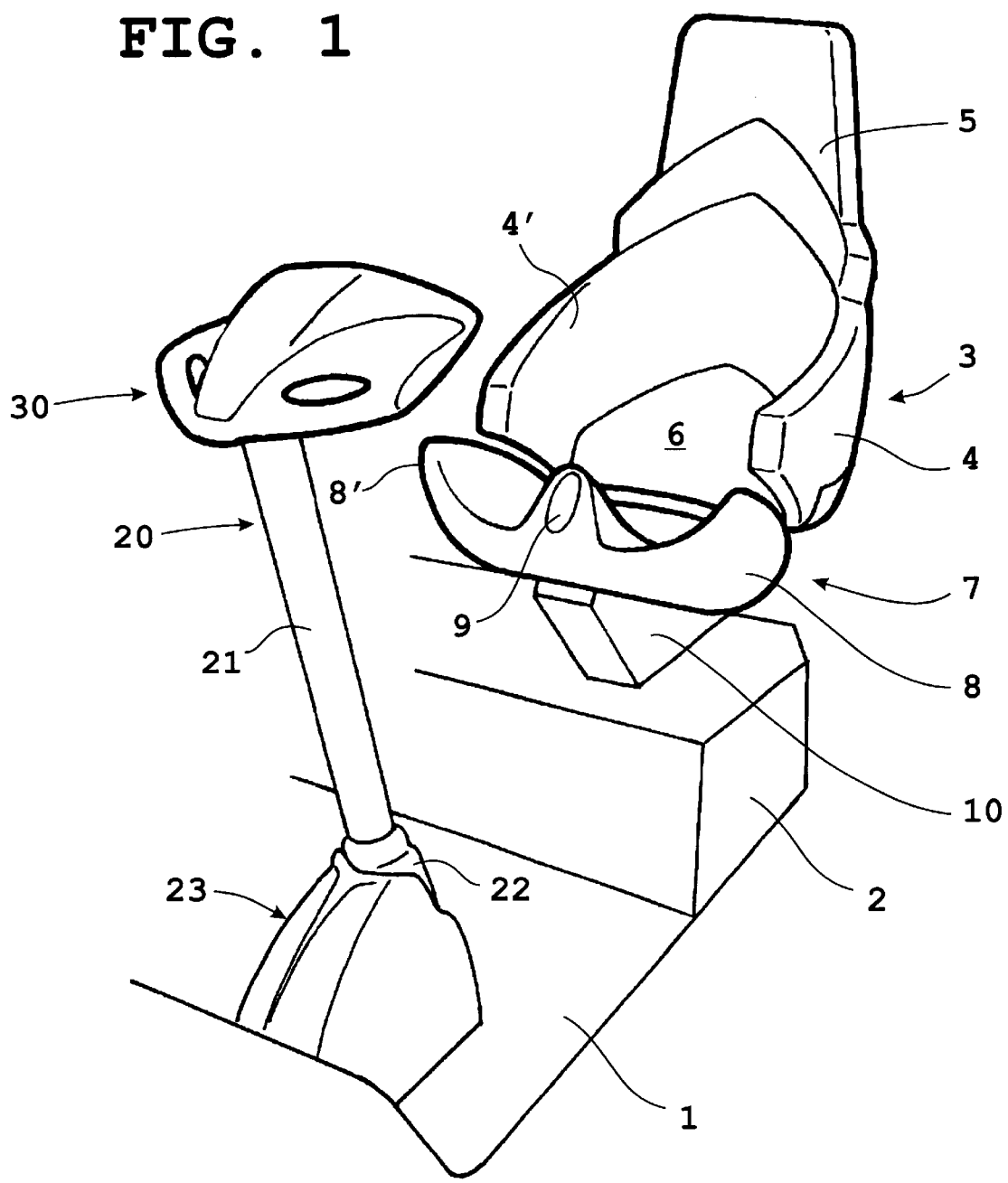
FIG. 1 is a part view in a three-quarter front perspective of an example of an installation according to the invention, the retaining device being shown in the open position.
Figure 2:
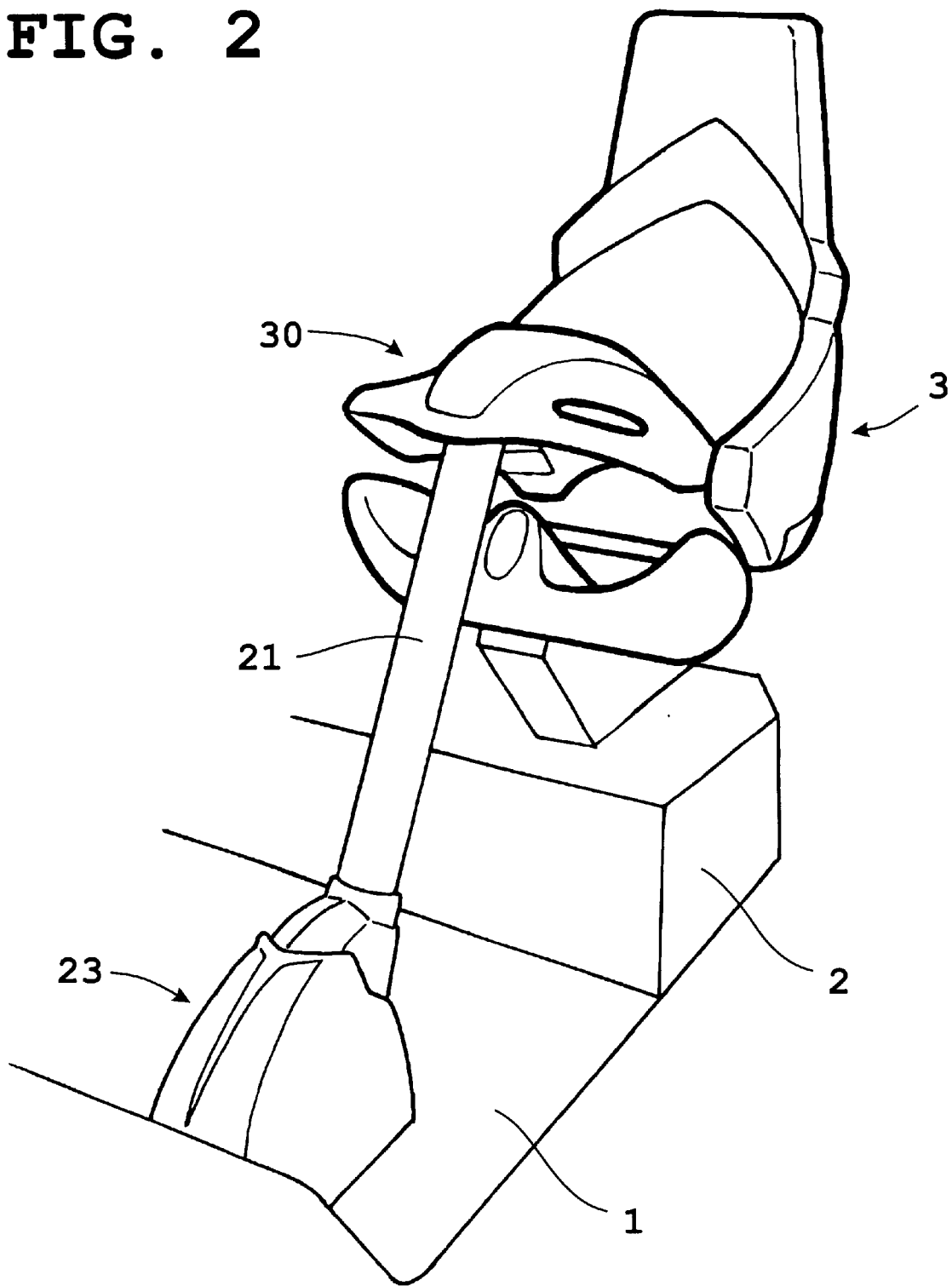
FIG. 2 is a partial view in a three-quarter front perspective of the installation from FIG. 1, the retaining device being represented in the closed position without a passenger in the seat.
Figure 4:
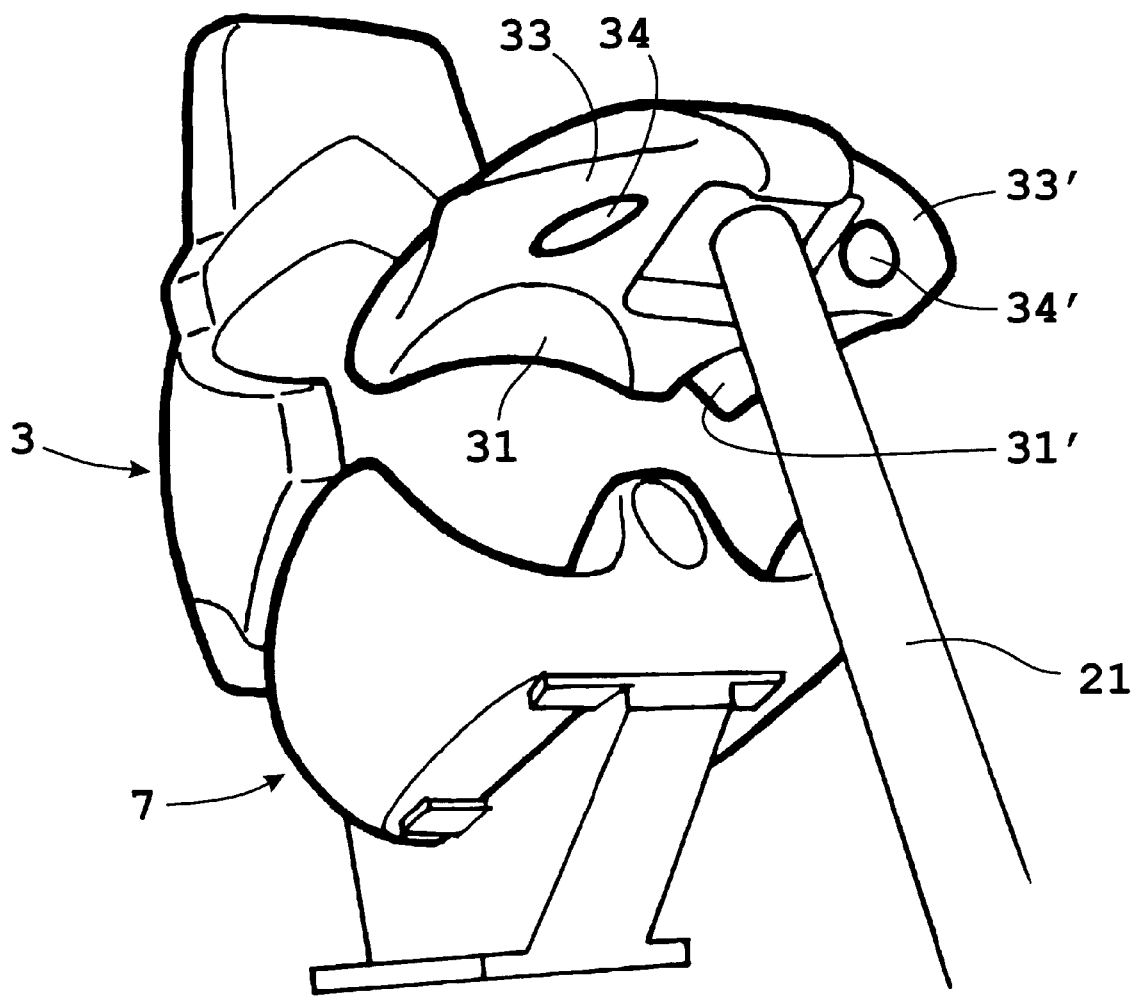
FIG. 4 is a partial view in a three-quarters front perspective from below the installation of FIG. 1, the retaining device being shown in the closed position without a passenger in the seat.

FIGS. 1, 2 and 4 show a part of a vehicle intended for an attraction ride of the roller coaster type according to the invention. Only a part of the floor 1, 2 of the vehicle is shown, on which are mounted, on the one hand, a seat 3, 7, and, on the other hand, the retaining device 20.

The seat comprises an upper part 3, in the form of a shell, forming the back section 5, 6 and the lateral parts 4, 4' of the seat, likewise serving as armrests, and a lower base part 7, constituting the footrest for the seat, moulded in the shape of the buttocks and thighs of a passenger. The two parts which make up the seat are fixed on a support element 10, which is itself fixed on a part 2 which is raised above the floor of the vehicle.

Clearly, the chair can equally well be made of one piece, or in any other manner.

Figure 3:
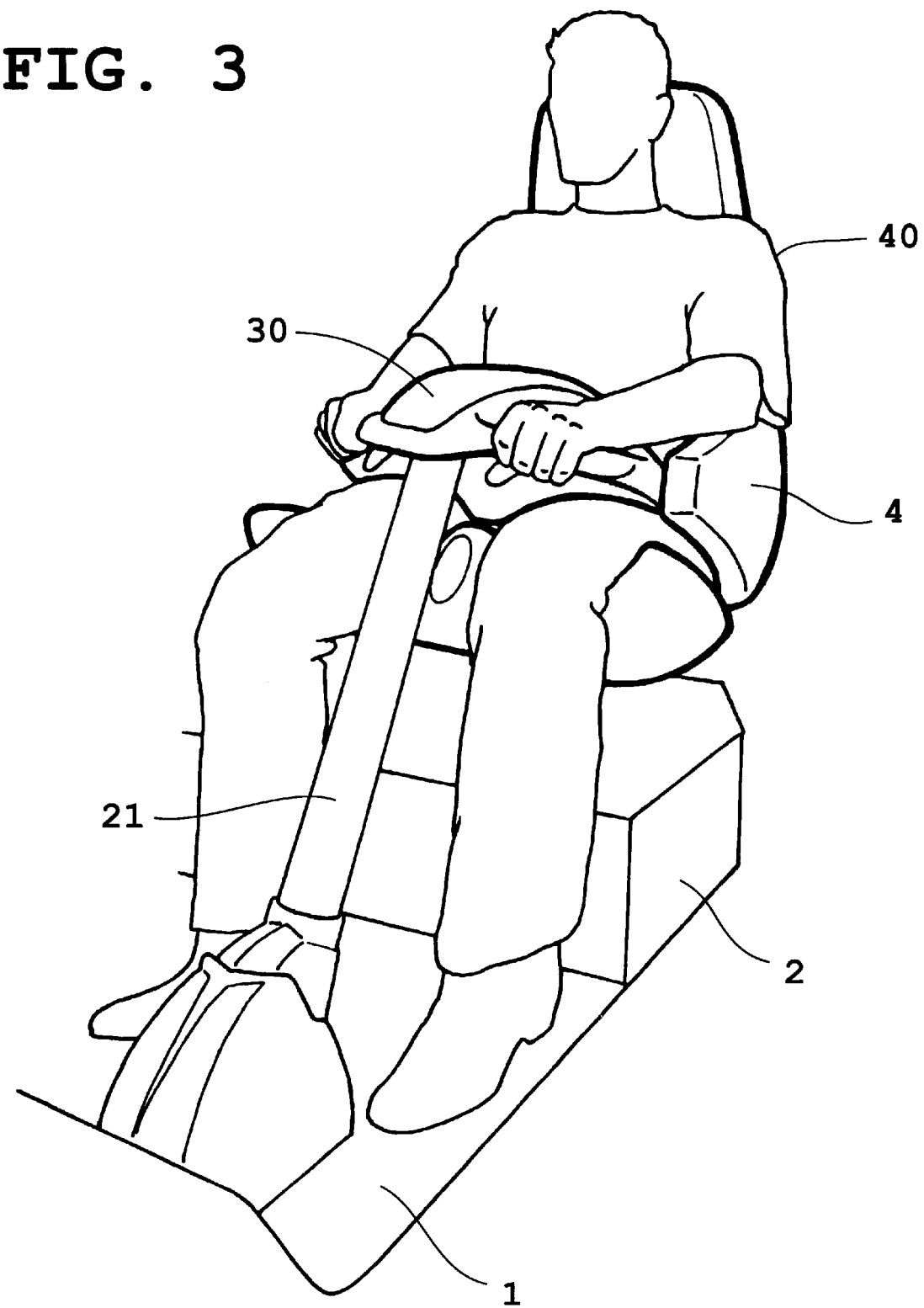
FIG. 3 is a partial view in a three-quarters front perspective of the installation in FIG. 1, the retaining device being represented in the closed position with a passenger in the seat.

The retention device 20 comprises of a pivoting bar 21, mounted at its lower end on a pivoting element 22 which is of one piece with a pivoting device 23 mounted on the floor 1 of the vehicle. A ventral retention element 30 of complex spatial form is mounted at the upper end of the bar 21. This element 30 is intended to interact with the seat 3, 7, after the pivoting of the bar 21 in the direction of the seat, so as to retain the passenger in the seat. The whole assembly is arranged in such a way that, in the blocking position, the retaining element 30 is positioned on the thighs and against the passenger's stomach, as shown in FIG. 3.

Figure 5:
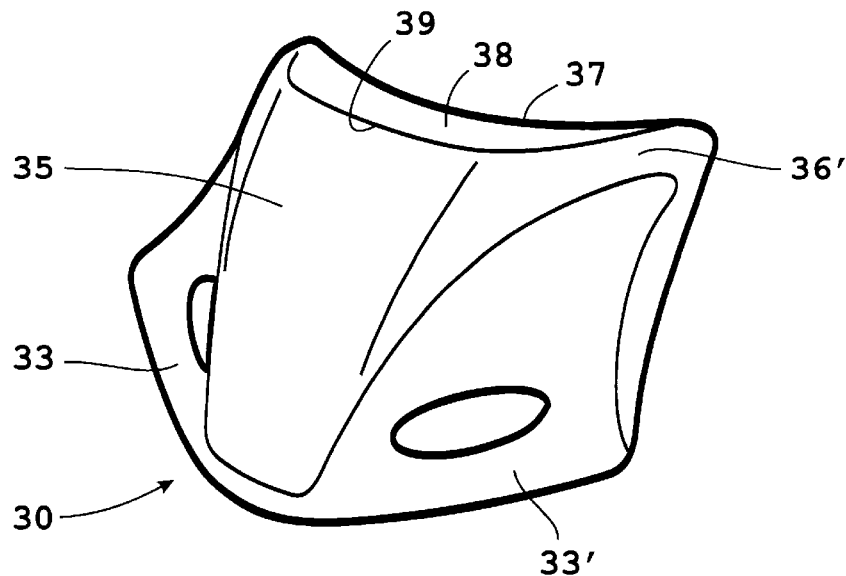
FIG. 5 is a partial view in a three-quarters front perspective of the retaining element of the retaining device in FIG. 1.
Figure 6:
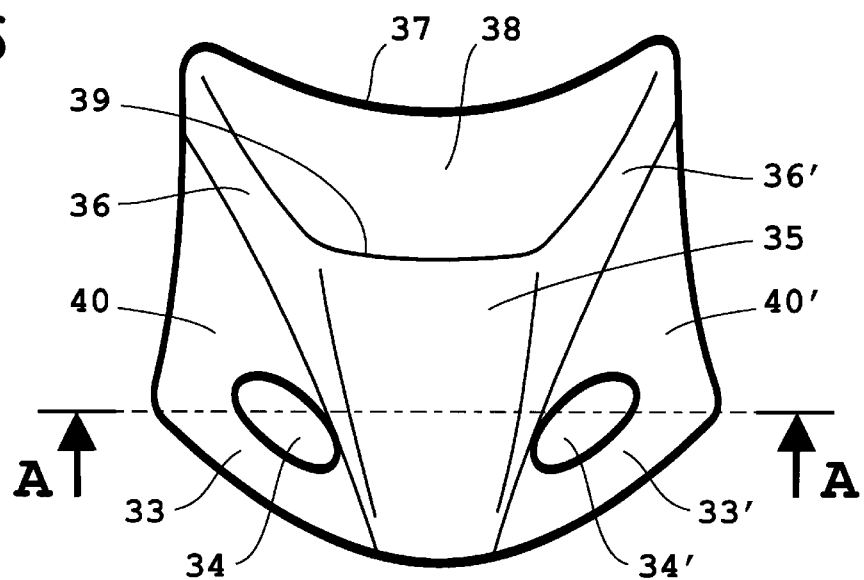
FIG. 6 is a view from above of the retaining element of FIG. 5.
Figure 7:
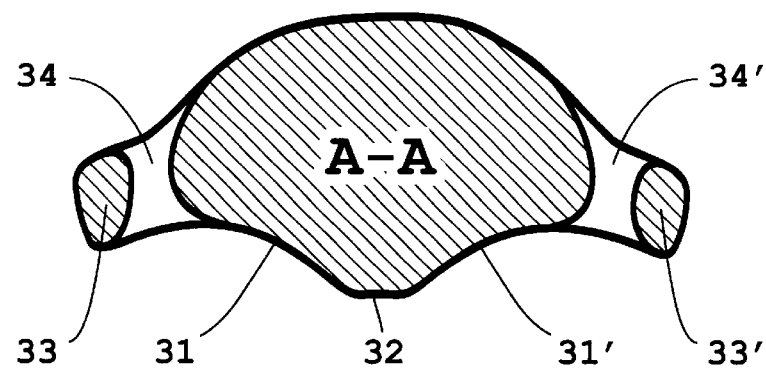
FIG. 7 is a section through the line A—A of the retaining element of FIG. 6.

To this end, as shown in FIGS. 5 to 7, the lower surface of the retaining element 30 comprises two parts 31, 31', of convex shape, shaped to fit the upper part of the thighs of a passenger when seated in the seat 3, 7. The rear edge 37 of the retaining element is rounded in shape, in such a way as to fit against the stomach of the passenger, against which it comes to rest in the blocking position. The upper surface of the retention element 30 is of a generally domed shape, and comprises a first rear face 38 of an approximately trapezoidal shape, inclined upwards, the large base of which is formed by the edge 37, and the small base 39 of which is formed by the side of a second upper face 35 of the cushion projecting forwards. On each side of the face 38, the upper surface of the retention element 30 comprises parts 36, 36', concave in shape, constituting of two shoulders 40, 40', at the two front left and right corners of the retaining element. Each of the shoulders 40, 40', is provided with a perforation 34, 34', close to the front end of the element, in such a way as to form handles 33, 33', arranged to be grasped by the passenger, who can grip on them throughout the ride if he so wishes.

This arrangement further allows the traditional support bars provided with handles and generally arranged in front of each row of passengers to be done away. It is better adapted to the comfort of the passenger than the traditional harness arrangement, which restrained the passenger totally, while still providing the passenger, as indicated earlier, with a much more pronounced feeling of individuality and freedom.

Figure 8:
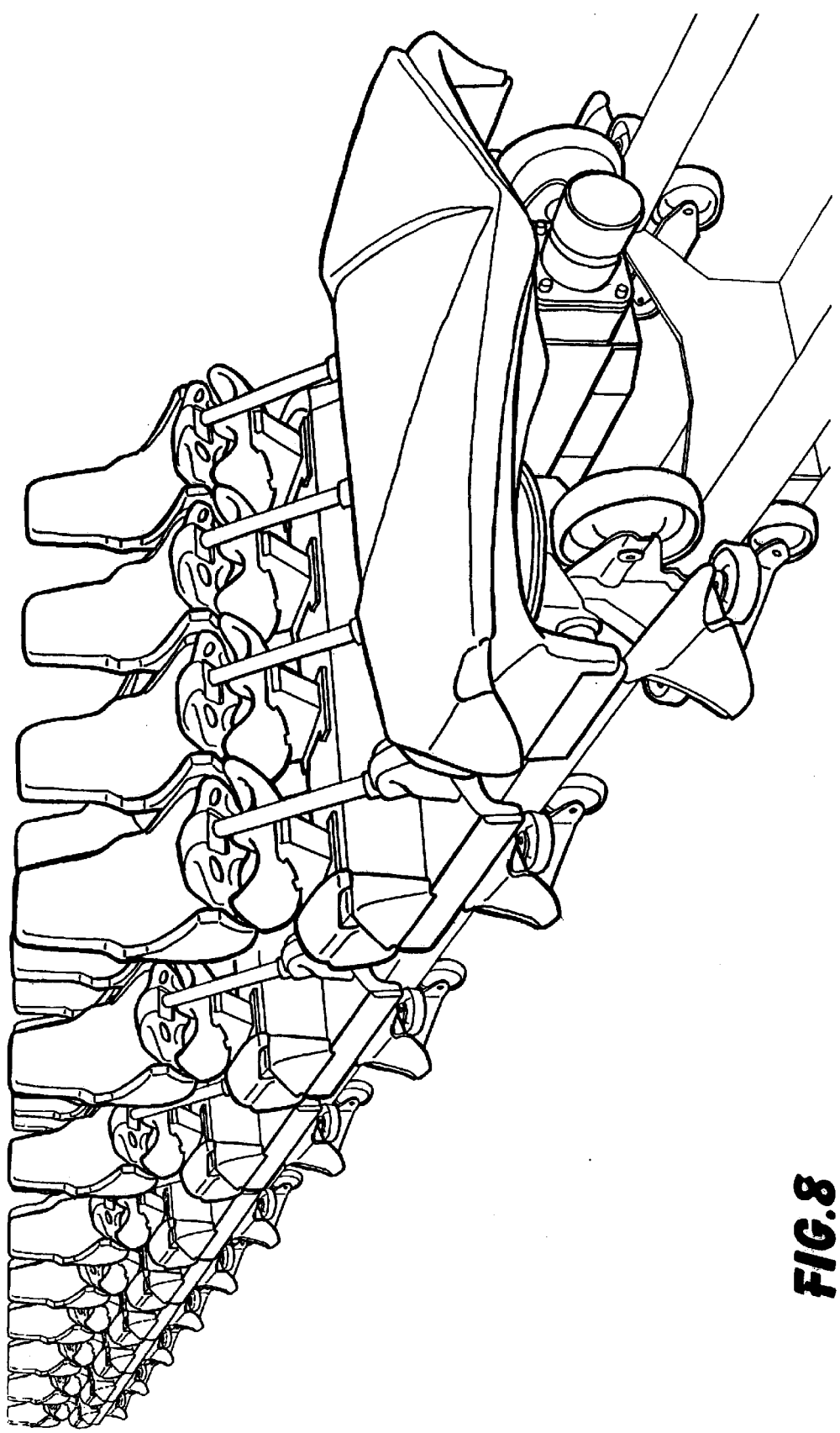
FIG. 8 is a more general view illustrating the fact that the seats and the retention device are arranged on a simple floor.

This feeling of individuality and freedom is all the more pronounced since, taking account of the arrangement of the seat and retention device according to the invention, the vehicle can be designed in a very simple manner, as shown in FIG. 8, with the seats and retention devices being fixed on simple floor arrangements without lateral or frontal elements of walls, in such a way as to give the passenger the impression of being seated on a flying carpet.

The gearing system for the pivoting arrangement 23 of the retention device is effected by means of a ratchet box acting on a toothed wheel, the mechanism allowing for the position of the retention element, in the form of a cushion, to be adjusted as a function of the vital statistics of the passenger and in particular his stoutness. Such a mechanism is inherently known and is therefore not described here in detail.

As can clearly be seen from FIGS. 2 to 4, when the retention device is in the closed position, the retention element interacts on the one hand with the lower part 7 of the chair, and, on the other hand, with the parts 4, 4' in the form of armrests for the upper part 3 of the chair. The passenger who is seated with his thighs set square in relation to his trunk is, in this configuration, prevented from sliding out of the chair, even deliberately, since on the one hand the thighs are trapped between the retention element 30 and the footrest 7 of the seat, and, on the other hand, the retention element rests against his stomach. The passenger is not, however, subjected to any frontal impediment at the level of the shoulders, which contributes to his comfort.

According to another embodiment of the invention, not shown in the drawing, the retention element does not have handles, the handles being, for example, integrated and/or formed as inherent parts of the ends in front of the armrests 4, 4' of the seat.

What is claimed is:

1. Installation for amusement park, comprising at least one vehicle designed in such a way as to be able of accommodating at least one passenger in at least one seat, associated with at least one retention device comprising a pivoting bar topped by a retention element intended to maintain the passenger in the seat, wherein the retention element features a complex spatial form, of which the lower part, intended to come in contact with the passenger's thighs, comprises for this purpose two recesses forming a hollow corresponding approximately to the passenger's thighs.

2. Installation according to claim 1, wherein the retention element features an external shape of multiple dishings and roundings.

3. Installation according to claim 1, wherein the retention element comprises handles.

4. Installation according to the preceding claim, wherein the handles are located in the front part of the retention element, and form integrated parts of the same.

5. Installation according to claim 1, wherein the retention element comprises an edge of rounded form, in such a way as to match at least partially with the stomach of the passenger against whom it comes to rest when the retention device is in the blocking position.

6. Installation according to claim 1, wherein the upper surface of the retention element is of a generally dished and rounded appearance, and comprises a first rear face essentially trapezoidal in shape, with a large base and a small base, inclined upwards, of which the large base is formed by the said edge of rounded shape, and of which the small base constitutes the side of a second upper face, inclining forwards, said element further comprising two front corners and parts which are concave in shape, constituting two shoulder edges at said two front corners, each of the said two shoulder edges containing a perforation in the vicinity of the front end of the retention device, in such a way as to form handles.

7. Element for retaining a passenger in a seat of an installation for amusement park, said element being mounted at the top of a pivoting bar and comprising a complex spatial form of which the lower part, intended to come in contact with the passenger's thighs, comprises for this purpose two recesses forming a hollow corresponding approximately to the passenger's thighs.

8. Element according to claim 7, further containing handles.

9. Element according to claim 7, comprising an edge of rounded shape, in such a way as to match at least in part the stomach of the passenger against whom it is intended to come to rest.

10. Element for retaining a passenger in a seat of an installation for amusement park, said element containing handles and comprising a complex spatial form of which the lower part, intended to come in contact with the passenger's thighs, comprises for this purpose two recesses forming a hollow corresponding approximately to the passenger's thighs, and wherein said element's upper surface is of a generally dished and rounded appearance, and comprises a first rear face essentially trapezoidal in shape with a large base and a small base, inclined upwards, of which the large base is formed by the said edge of rounded shape, and of which the small base constitutes the edge of a second upper face inclined forwards, said element further comprising front corners and parts concave in shape, consisting of two shoulder edges at said two front corners, each of the said two shoulder edges containing a perforation in the vicinity of the front end of the element, in such a way as to form handles.

11. Element according to claim 10, comprising an edge of rounded shape, in such a way as to match at least in part the stomach of the passenger against whom it is intended to come to rest.

* * * * *